Patented May 30, 1933

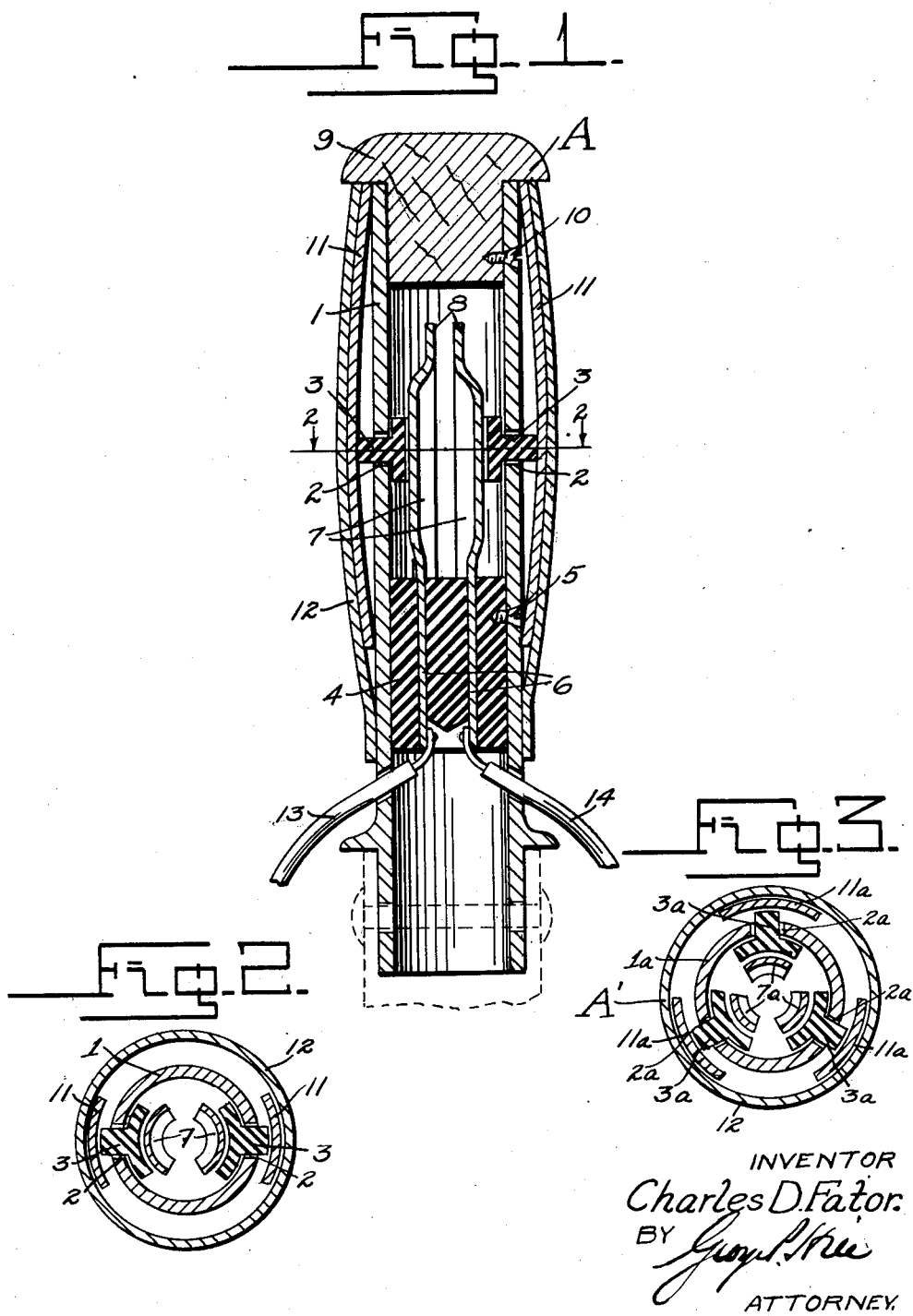

1,911,444

UNITED STATES PATENT OFFICE

CHARLES D. FATOR, OF THE UNITED STATES ARMY, WHEELER FIELD, HONOLULU, TERRITORY OF HAWAII

ELECTRIC CONTACT GRIPPING DEVICE

Original application filed November 28, 1931, Serial No. 577,761. Divided and this application filed November 4, 1932. Serial No. 641,257.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates to an improved electric contact gripping device, and more particularly it is directed to a device of this character for use on hand controls of a vehicle for determining the intensity under which a driver operates the vehicle. The said invention in an improved electric contact gripping device is a division of my application, Serial No. 577,761, filed November 28, 1931.

One of the objects of my invention is to provide an electric contact gripping device for use on the hand controls of all manner of aircraft for closing an electrical circuit when a predetermined excessive pressure is applied by a student pilot to the controls of the aircraft.

Another object of my invention is to provide an electric contact gripping device which is simple to operate, cheap to construct, which may be readily applied to the control stick of an aircraft, and which is not liable to get out of order.

In the aviation service over-tenseness is a serious factor in the training of student pilots in operating the aircraft because in order that a student pilot of aircraft may become successful in the operation thereof he must learn to relax on the controls, that is to use his muscles naturally and avoid over-straining, and not take a death grip on the controls which usually is the case of the beginner. This is usually quite difficult for the beginner, as he must be reminded quite often to relax. The sooner the student masters the art of relaxing the sooner he learns the "feel" of the controls necessary to learn to fly. Only excessive over-tenseness can be readily noticed by the instructor in the student, so when the student is only slightly tensed-up he may plod along for sometime, gradually lagging behind the other student pilots on account of the handicap of his tenseness.

It is therefore the aim and purpose of this invention to provide an improved means in the form of an electric contact gripping device for determining the intensity under which a student pilot operates the aircraft, the electric contact gripping device being mounted on the hand control of the aircraft and adapted to close an electrical circuit including an indicator when a predetermined excessive pressure is applied by a student pilot to the hand control of the aircraft.

With the above and other objects and advantages in view, the invention specifically consists in features of construction, arrangement, and operation of parts which will hereinafter appear. For purposes of illustration the invention will be described and claimed with reference to the accompanying drawing in which like numbers distinguish like parts and in which:

Fig. 1 is a vertical cross-sectional view of my improved electric contact gripping device applied to the control stick of an aircraft.

Fig. 2 is a cross-sectional view thereof taken on line 2—2 of Fig. 1.

Fig. 3 is a cross-sectional view of a modified form of contact gripping mechanism.

In the illustrated embodiment characterizing my invention, my improved contact gripping device indicated generally by A comprises a longitudinally extending cylindrical casing 1 having transverse aligned apertures 2 intermediate the ends thereof in which plunger buttons 3 are movably mounted. These plunger buttons 3 are made of any suitable insulating material such as porcelain or hard rubber. Near the lower end of the casing 1 and in the interior thereof is a cylindrical plug 4 made of any suitable insulating material such as bakelite which is rigidly connected to the casing 1 by any suitable means such as by screw 5. The plug 4 is provided for holding the lower ends 6 of resilient contact members 7 and insulating the same from each other. The free ends of the contact members 7 project longitudinally upward in the cylindrical casing 1 and terminate in inwardly bent ends 8 to provide contact points for the resilient contact members 7.

The upper end of the casing 1 is closed by a removable cap 9 made of any desirable material such as wood, which is connected to the casing 1 by any suitable means such as by screw 10.

Mounted on the exterior of the casing 1 are metallic spring arms 11 which lie adjacent the outer ends of the plunger buttons 3. These spring arms 11 are shaped to correspond to the general form of the casing 1 and have their upper ends rigidly secured to the upper end of the casing 1 while at their lower ends they are free to slide up and down on the casing 1 when the gripping device A is gripped and operated by the hand. Surrounding the whole grip assembly is a cover 12 made of any suitable material such as live springy rubber. Connected to the lower end of the resilient contacting members 7 are ends of electric conductors 13 and 14 of an electrical indicating circuit (not shown) in which the gripping device A is adapted to be inserted.

A modification of the contact gripping device A' illustrated in Fig. 3 of the drawing is similar to the one illustrated in Fig. 2 thereof and described above, except a trio of push buttons 3a together with resilient contact members 7a and spring arms 11a are used which are equally spaced around the cylindrical casing 1a having apertures 2a in which the push buttons 3a are mounted. One of the resilient contact members 7a is electrically neutral and insulated from the other two contact members 7a. Said neutral contact 7a contacts with the other contacts 7a to complete the circuit between them. This gives a more uniform result than the device shown in Figs. 1 and 2 of the drawing because of the increased number of contacts. All three buttons 3a if pressed in closes a circuit including an indicator (not shown) as would be the case when the gripping device A' was gripped abnormally for operating the indicator in the circuit.

To install my contact gripping device A on the control stick of an aircraft as an accessory, the old gripping portion would be sawed off just below the grip and my improved contact gripping device inserted and bolted or riveted thereon. For initial installation the gripping device A could be made as part of the stick, in which case the conductors 13 and 14 thereof for the signalling circuit (not shown) would pass down through the stick and out at the bottom instead of out above the point of attachment as shown in Fig. 1 of the drawing which illustrates the gripping device A used for accessory installation.

It will thus be seen that this invention provides a highly novel, simple and efficient form of electric contact gripping device that is well adapted for all the purposes designated. Even though it is herein shown and described that my invention comprises certain features of construction, arrangement and operation, it is nevertheless to be understood that changes may be made therein without departing from the spirit or scope of my invention, which broadly comprises a grip control switch in the form of a handle comprising a cylindrical casing having transverse aligned apertures intermediate the ends thereof, a plug mounted in said casing, resilient contact members having contact points on their upper ends and terminals on the lower ends thereof mounted on said plug, grip actuated depression means comprising buttons mounted in the apertures of said casing and resilient hand gripping means engaging said buttons, said buttons engaging said spring pressed contact points and a cover provided on said grip control switch.

Now that I have disclosed my invention, what I claim as new and useful is:

1. A grip control switch in the form of a handle, comprising spring pressed contact points having terminals, grip actuated depressing means comprising movable buttons and resilient hand gripping means engaging said buttons, said buttons engaging said spring pressed contact points.

2. A grip control switch in the form of a handle, comprising a casing having apertures intermediate the ends thereof, buttons movably mounted in said apertures, a plug mounted in said casing, spring pressed contact points having terminals mounted on said plug, and resilient hand gripping means engaging said buttons, said buttons engaging said spring pressed contact points.

3. A grip control switch in the form of a handle, comprising a cylindrical casing having transverse aligned apertures intermediate the ends thereof, buttons movably mounted in said apertures, a plug mounted in said casing, spring pressed contact points having terminals mounted on said plug, resilient hand gripping means engaging said buttons, said buttons engaging said spring pressed contact points and a cover on the outer surface of said resilient hand gripping means and surrounding said casing.

CHARLES D. FATOR.